United States Patent Office 3,163,643
Patented Dec. 29, 1964

3,163,643
DERIVATIVES OF 3,4-DIHYDRO-2H-1,2,4-BENZO-
THIADIAZINE-1,1-DIOXIDE
George de Stevens, New Providence, and Lincoln Harvey
Werner, Summit, N.J., assignors to Ciba Corporation,
a corporation of Delaware
No Drawing. Filed Apr. 17, 1959, Ser. No. 807,028
3 Claims. (Cl. 260—243)

The present invention concerns 3-acyl-lower alkyl-3,4-dihydro - 2H - 1,2,4-benzothiadiazine-1,1-dioxides. More particularly, it relates to compounds of the formula:

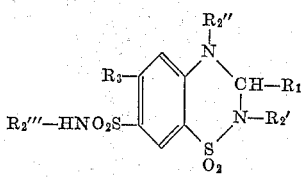

in which $R_1$ represents acyl-lower alkyl, each of the radicals $R_2'$, $R_2''$ and $R_2'''$ stands for hydrogen or lower alkyl and $R_3$ represents lower alkyl, halogeno-lower alkyl or halogen, or alkali metal salts thereof, as well as process for the preparation of such compounds.

The lower alkyl portion in the acyl-lower alkyl substituent is represented primarily by a lower alkylene radical having from one to seven carbon atoms; such radicals are 1,1-methylene, 1,1-ethylene, 1,2-ethylene, 1,1-dimethyl-1,2-ethylene, 1,1-propylene, 1,2-propylene, 1,3-propylene, 2,3-propylene, 2,2-propylene, 1,1-butylene, 1,2-butylene, 1,3-butylene, 1,4-butylene, 2,2-butylene, 2,3-butylene, 1,5-pentylene, 2,5-pentylene, etc.

An acyl group represents primarily the acyl radical of an organic carboxylic acid, primarily a lower alkanoic acid, e.g. acetic, propionic or butyric acid. Further acyl radicals are those derived from other aliphatic carboxylic acids, for example, a substituted carbonic acid, e.g. methoxy-carbonic acid, ethoxy-carbonic acid or benzyloxy-carbonic acid, lower alkenoic acids, e.g. acrylic or methacrylic acid, lower aliphatic dicarboxylic acids, e.g. oxalic, malonic, succinic, glutaric, adipic, maleic or fumaric acid, or their halfesters with lower alkanols, e.g. methanol or ethanol. Acyl radicals of carbocyclic aryl-carboxylic acids are primarily those of monocyclic carbocyclic aryl-carboxylic acids, e.g. benzoic or substituted benzoic acids; acyl radicals of carbocyclic aryl-lower aliphatic carboxylic acids are primarily those of monocyclic carbocyclic aryl-lower alkyl carboxylic acids, e.g. phenylacetic or dihydrocinnamic acid, which may contain additional substituents in the aromatic portion, or monocyclic carbocyclic aryl-lower alkenyl carboxylic acids, e.g. cinnamic acid or substituted cinnamic acids. Substituents of aromatic portions are particularly lower alkyl, e.g. methyl, hydroxyl, lower alkoxy, e.g. methoxy, or halogen, e.g. chlorine or bromine.

The radicals $R_2'$, $R_2''$ and $R_2'''$ represent primarily hydrogen; lower alkyl substituents are primarily methyl or ethyl.

The substituent $R_3$ in the 6-position of the 3,4-dihydro-2H-1,2,4-benzothiadiazine-1,1-dioxides of this invention represents primarily halogen, such as fluorine, bromine or particularly, chlorine. Furthermore, lower alkyl, e.g. methyl, or, more desirable, halogeno-lower alkyl, e.g. trifluoromethyl, may also be anticipated as substituents of the 6-position.

An alkali metal salt is particularly a sodium or a potassium salt.

The 3 - acyl - lower alkyl-3,4-dihydro-2H-1,2,4-benzothiadiazine-1,1-dioxides of this invention have diuretic and natriuretic properties and may be used as diuretic and natriuretic agents of improved properties to relieve excessive states of water and sodium retention, as connected, for example, with heart troubles. In addition, these compounds have antihypertensive properties, which may be utilized in the treatment of hypertensive conditions.

Particularly useful as diuretic and natriuretic agents are the 2-$R_2'$-3-lower alkanoyl-lower alkyl-4-$R_2''$-6-$R_3$-7-(N-$R_2'''$ - sulfamyl)-3,4-dihydro-2H-1,2,4-benzothiadiazine-1,1-dioxides, in which each of the radicals $R_2'$, $R_2''$ and $R_2'''$ represents hydrogen or methyl, and $R_3$ stands for methyl, trifluoromethyl, bromine or chlorine. This group is represented by 2-$R_2'$-3-lower alkanoyl-methyl-6-$R_3$-7-sulfamyl - 3,4 - dihydro - 2H-1,2,4-benzothiadiazine-1,1-dioxides, in which $R_2'$ represents hydrogen or methyl, and $R_3$ stands for chlorine or trifluoromethyl.

The new compounds of this invention may be used as medicaments in the form of pharmaceutical preparations, which contain the new 3,4-dihydro-2H-1,2,4-benzothiadiazine-1,1-dioxides or the salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in solid form, for example, as capsules, tablets or dragees, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

The compounds of this invention are advantageously prepared by reacting an aniline compound of the formula:

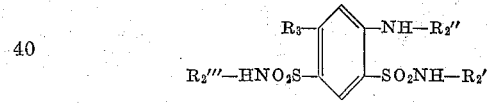

in which $R_2'$, $R_2''$, $R_2'''$ and $R_3$ have the previously given meaning, with an aldehyde of the formula $R_1$—CHO, in which $R_1$ has the above-given meaning, or a derivative thereof, and, if desired, replacing in a resulting 3,4-dihydro-2H-1,2,4-benzothiadiazine-1,1-dioxide containing a sulfamyl-nitrogen with hydrogen, such hydrogen by lower alkyl, and/or, if desired, converting a resulting salt into the free compound, and/or, if desired, converting a resulting free compound into a salt thereof.

Although the aldehyde is preferably reacted with the aniline derivative in approximately stoichiometric amounts, it may also be given to the reaction mixture in excess amounts. The reaction may be performed in the absence of any condensing reagent, or in the presence of a base, such as an alkali metal hydroxide, e.g. lithium, sodium or potassium hydroxide, whereby the aldehyde is used in its reactive form. It may also be carried out in the presence of a small amount of an acid, for example, a mineral acid, such as hydrohalic acid, e.g. hydrochloric or hydrobromic acid, or sulfuric acid, if desired, in anhydrous form. Furthermore, the aldehyde may be given into the reaction medium in a form which yields the desired reactant in situ. Thus, for example, an acetal of an aldehyde $R_1$—CHO with a lower alkanol, for example, methanol or ethanol, may be used, whereby the presence of an acid is necessary to convert the derivative, e.g. the acetal, into the reactive form. Such acetals are, for example, 1,1-dimethoxy-2-acetyl-ethane, 1,2-diethoxy-2-acetyl-ethane, 1,1-diethoxy - 2 - propionyl-ethane, etc.

The reaction may be carried out in the absence or preferably in the presence of a solvent, for example, an ether, e.g. p-dioxane or diethyleneglycol dimethylether, a lower alkanol, e.g. methanol or ethanol, or a formamide, e.g. dimethylformamide, or an aqueous mixture of such solvents. If desired, it may be completed at an elevated temperature, for example, on the steam bath or at the boiling temperature of the solvent. If necessary, the reaction may be performed under increased pressure or in the atmosphere of an inert gas, e.g. nitrogen.

The starting materials used in the above-described reactions are known, or, if new, may be prepared according to procedures used for the manufacture of known compounds. For example, by treatment of a 3-$R_3$—N—$R_2''$-aniline, in which $R_2''$ and $R_3$ have the above-given meaning, with chlorosulfonic acid, two sulfonyl chloride groups are introduced to form 5-$R_3$—N—$R_2''$-aniline-2,4-disulfonyl chlorides. These are subsequently reacted with ammonia, e.g. liquid or gaseous ammonia or a solution of ammonia in water or in a lower alkanol, methanol or ethanol, or with a lower alkylamine, e.g. methylamine or ethylamine, to yield the desired starting materials of the above-mentioned type.

In resulting 3-acyl-lower alkyl-3,4-dihydro-2H-1,2,4-benzothiadiazine-1,1-dioxides, containing sulfamyl-nitrogens with hydrogen, such hydrogen may be replaced by lower alkyl. Generally, an alkali metal salt of the starting material is formed and such salt is then reacted with the reactive ester of a lower alkanol. These esters are particularly those of lower alkanols, e.g. ethanol, or particularly methanol, with strong mineral acids, such as hydrohalic acids, e.g. hydrochloric, hydrobromic or hydriodic acid, or sulfuric acid. For example, treatment of the starting material with a di-lower alkyl sulfate, such as, for example, dimethyl sulfate or diethyl sulfate, in the presence of an alkaline reagent, such as an alkali metal hydroxide, e.g. lithium, sodium or potassium hydroxide, is a preferred procedure. As solvents, water or water miscible organic solvents, such as lower alkanols, e.g. methanol, ethanol, propanol, isopropanol or tertiary butanol; ethers, e.g. diethyleneglycol dimethylether, or formamides, e.g. dimethylformamide, may be used.

The alkylation reaction may be carried out under cooling, at room temperature, or at an elevated temperature, if necessary, in a closed vessel, e.g. sealed tube, under pressure and/or in the atmosphere of an inert gas, e.g. nitrogen.

An N-unsubstituted sulfamyl group in the carbocyclic portion of the molecule may simultaneously be alkylated; if necessary, this may be prevented to a large extent by varying the conditions and/or the molar ratios of the reactants. A resulting mixture of products may be separated into the single components, for example, by fractionated crystallization, utilizing the differing solubilities in different solvent systems.

The resulting product may be obtained in the form of the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. p-dioxane or diethyleneglycol dimethylether, solution, with an alkali metal hydride or amide, e.g. sodium or potassium hydride or amide, and removing the solvent. Mono- or poly-salts may be obtained.

Any resulting racemate may be converted into the antipodes thereof according to methods used for resolving racemates.

This application is a continuation-in-part application of our application Serial No. 764,482, filed September 29, 1958, which in turn is a continuation-in-part of our application Serial No. 751,620, filed July 29, 1958, now abandoned, which in turn is a continuation-in-part of our application Serial No. 740,582, filed June 9, 1958, now abandoned, which in turn is a continuation-in-part of our application Serial No. 727,242, filed April 9, 1958, now abandoned.

The following example illustrates the invention; it is not to be construed as being a limitation thereon. Temperatures are given in degrees centigrade.

Example

A mixture of 5.7 g. of 5-chloro-2,4-disulfamyl-aniline, 2.6 g. of 1,1-dimethoxy-3-oxo-butane and 3 ml. of ethyl acetate, saturated with hydrogen chloride, in 25 ml. of diethylene glycol dimethylether is heated at 95° for one hour. The solution is evaporated to about one third of its volume and then poured into water while stirring. The solid material is collected and recrystallized from a mixture of ethanol and water to yield 1.5 g. of 3-acetylmethyl-6-chloro-7-sulfamyl-3,4-dihydro-2H-1,2,4-benzothiadiazine-1,1-dioxide, M.P. 188–190°.

Other 3-acyl-lower alkyl-3,4-dihydro-2H-1,2,4-benzothiadiazine-1,1-dioxides, which may be prepared according to the same procedure by choosing the appropriate starting materials, are, for example, 6-chloro-3-propionylmethyl-7-sulfamyl-3,4-dihydro-2H-1,2,4-benzothiadiazine-1,1-dioxide or 3-acetylmethyl-7-sulfamyl-6-trifluoromethyl-3,4-dihydro-2H-1,2,4-benzothiadiazine-1,1-dioxide.

What is claimed is:
1. A member of the group consisting of 3,4-dihydro-2H-1,2,4-benzothiadiazine-1,1-dioxides of the formula:

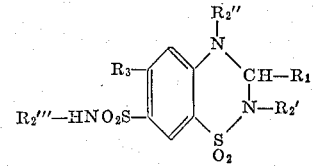

in which $R_1$ represents lower alkanoyl-lower alkyl, each of the radicals $R_2'$, $R_2''$ and $R_2'''$ represents a member of the group consisting of hydrogen and lower alkyl, and $R_3$ stands for a member of the group consisting of lower alkyl, chlorine and bromine, and alkali metal salts thereof.

2. 3-lower alkanoyl-methyl-6-halogeno-7-sulfamyl-3,4-dihydro-2H-1,2,4-benzothiadiazine-1,1-dioxide.

3. 3-acetylmethyl-6-chloro-7-sulfamyl-3,4-dihydro-2H-1,2,4-benzothiadiazine-1,1-dioxide.

References Cited in the file of this patent

UNITED STATES PATENTS 3,025,292  Jones _____ Mar. 13, 1962
3,043,840  Downing _____ July 10, 1962

OTHER REFERENCES

Herrmann et al.: Texas State J. of Medicine (December 1958), pp. 854–858.

The Wall Street Journal, Nov. 5, 1958, p. 19 (Washington, D.C., edition).